United States Patent [19]

Legille et al.

[11] 4,023,832
[45] May 17, 1977

[54] APPARATUS FOR THE TRANSMISSION OF HEATED FLUID

[75] Inventors: Edouard Legille, Luxembourg; René N. Mahr, Howald-Hesperange, both of Luxembourg

[73] Assignee: S.A. des Anciens Etablissements Paul Wurth, Luxembourg, Luxembourg

[22] Filed: Sept. 16, 1975

[21] Appl. No.: 613,888

[30] Foreign Application Priority Data

Sept. 18, 1974  Luxembourg .......................... 70943

[52] U.S. Cl. .............................. 285/41; 110/182.5; 285/55; 285/114; 285/226
[51] Int. Cl.[2] .......................................... F16L 53/00
[58] Field of Search ................ 285/41, 265, 55, 47, 285/226, 114; 110/182.5; 122/6.6; 266/41

[56] References Cited

UNITED STATES PATENTS

| | | | |
|---|---|---|---|
| 3,049,877 | 8/1962 | Sherman | 285/41 X |
| 3,341,188 | 9/1967 | Armour et al. | 110/182.5 X |
| 3,662,696 | 5/1972 | Mahr | 110/182.5 |
| 3,766,868 | 10/1973 | Mahr | 110/182.5 |
| 3,901,539 | 8/1975 | Ijzerman | 285/41 |

*Primary Examiner*—Dave W. Arola

[57] ABSTRACT

Segmented conduits for transmitting heated fluid, and particularly tuyere feed lines for injecting preheated air into shaft furnaces, have an annular cooling chamber incorporated into the coupling joints between conduit sections. The cooling chambers are positioned inwardly toward the conduit axis with respect to flexible bellows devices which heremetically seal the articulated coupling joints.

8 Claims, 2 Drawing Figures

APPARATUS FOR THE TRANSMISSION OF HEATED FLUID

BACKGROUND OF THE INVENTION

1. Field of the Invention

The present invention relates to the transmission of heated fluids. More specifically, this invention is directed to segmented conduits, which may be employed as tuyere feed lines for the delivery of preheated gas to the interior of a furnace and particularly to compensation joints for use in interconnecting the segments of such conduits. Accordingly, the general objects of the present invention are to provide novel and improved methods and apparatus of such character.

2. Description of the Prior Art

While not limited thereto in its utility, the present invention is particularly well suited for use in a temperature compensating joint in a tuyere feed line for a shaft furnace. In shaft furnaces, particularly in blast furnaces, preheated air is injected into the furnace through a plurality of injection nozzles located about the periphery of the furnace. These injection nozzles are connected to a common supply of preheated air by means of feed lines known as tuyere stocks. The heated gas supply will in part be in the form of a pipe, generally of circular cross-section, positioned coaxially of the furnace and spaced from the external furnace wall. The tuyere stocks typically comprise a number of serially connected tubular elements or segments which are internally lines with a refractory material.

In order to compensate for manufacturing and installation tolerances, and particularly to compensate for thermal expansion which occurs during the course of operation of the furnace, the adjacent segments of the tuyere stocks in the direction of gas flow are coupled together by means of swivel joints, bellows-type expansion compensators or compensators of the type employing Cardan joints.

For a further explanation of tuyere stocks, and particularly preheated air feed lines of the type employing Cardan compensators, reference may be had to U.S. Pat. 3,662,696 and 3,766,868. U.S. Pat. Nos. 3,662,696 and 3,766,868 which are assigned to the assignee of the present invention, are hereby incorporated herein by reference. The tuyere stocks of the referenced patents offer the advantage of permitting compensation for differential deformations during use and manufacturing inaccuracies between tubular segments of a tuyere stock to be achieved through the use of Cardan joints in conjunction with bellows-type compensators having a very small number of corrugations.

To summarize, the state of the art, it is known to provide articulated temperature compensation joints between segments of a tuyere stock which is employed to deliver preheated air from a common supply pipe to an injection nozzle in the wall of a shaft furnace. U.S. Pat. Nos. 3,662,696 and 3,766,868 show and describe compensation joints which have proven to be highly successful. These compensators employ Cardan joints and bellow-type elements; the bellows elements being employed to provide hermetic sealing about the articulation surfaces of the joint assembly. The bellows elements, which are directly exposed to the heated gases, are the components of the tuyere stock compensation joints most susceptible to deterioration as a result of the extremely high operating environment temperature. Potential failure of the bellows-type elements presents a serious safety hazard and compensation joint repair or replacement, either when a bellows failure occurs or as part of a required preventative maintenance schedule, has a deleterious effect on the efficiency of operation of the furnace. Thus, it has for some time been desired to limit the temperature of the bellows-type elements of tuyere stock compensator joints. Also, considering the compensator joints of the referenced U.S. patents, the bellows-type elements are fabricated from special high temperature steels. It would be desirable in the interest of minimizing joint manufacturing expense through the use of less costly materials, to use standard materials but this result can be realized only through preventing over-temperature of the bellows-type elements.

SUMMARY OF THE INVENTION

The present invention comprises an improvement over the Cardan-type tuyere stock compensation joints of the referenced patents. In accordance with the present invention, each of the compensation joints is provided with means which prevents the corrugated bellows-type compensator element of the joint assembly from being heated to excessive temperatures. In accordance with a preferred embodiment, such temperature limiting means comprises an annular cooling chamber positioned concentrically around the refractory lining in the joint assembly; the cooling chambers thus being positioned generally between the bellows element and the components of the joint assembly which are directly exposed to the preheated gas being delivered to a furnace.

BRIEF DESCRIPTION OF THE DRAWING

The present invention may be better understood and its numerous objects and advantages will become apparent to those skilled in the art by reference to the accompanying drawing wherein like reference numerals refer to like elements in the two figures and in which.

Figure 1:
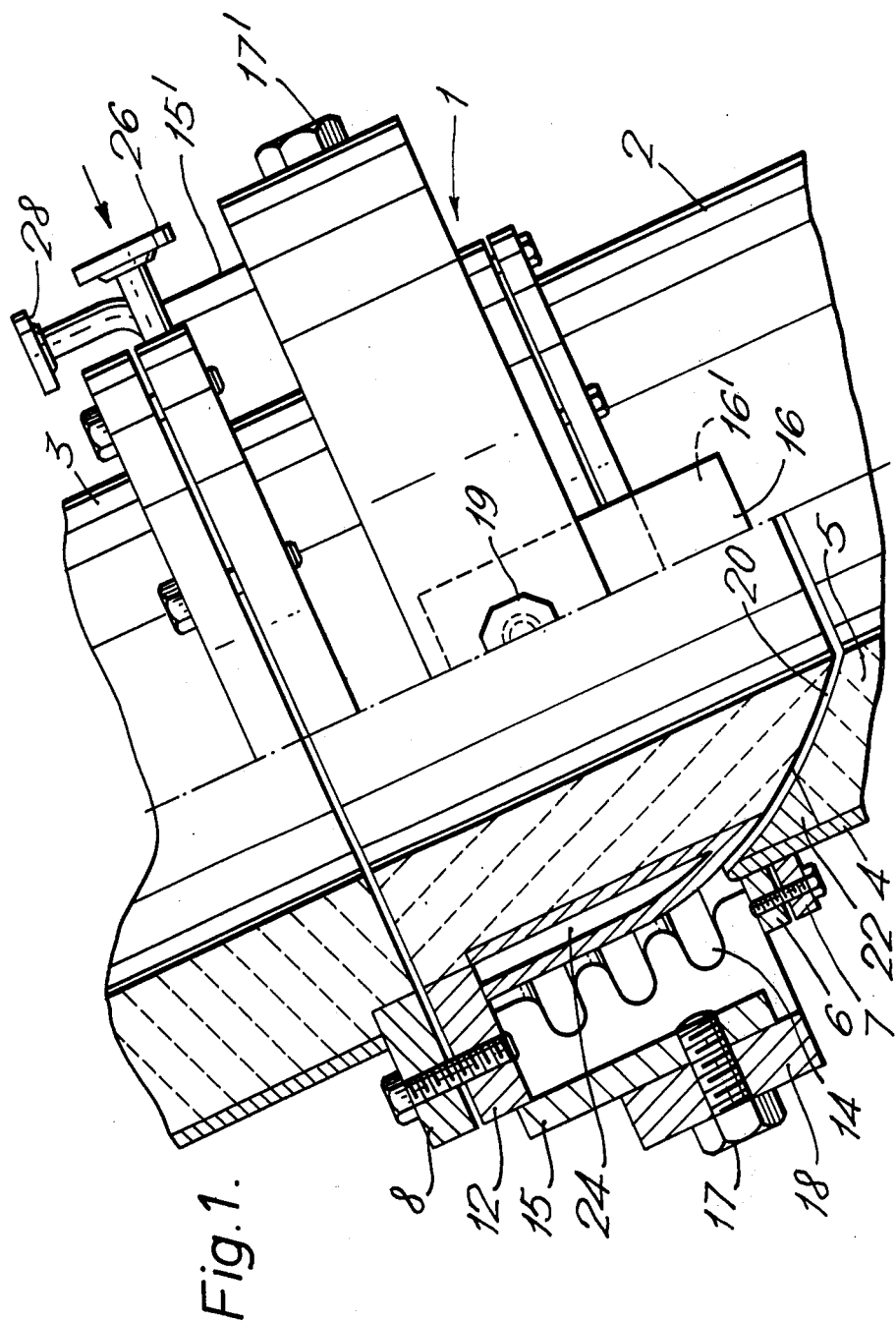
FIG. 1 is a longitudinal view, partly in section, through a first embodiment of the present invention.

DESCRIPTION OF THE PREFERRED EMBODIMENTS:

With reference to FIG. 1, a Cardan-type compensation joint is indicated generally at 1. The compensation joint 1 inter-connects and provides fluid communication between lower and upper tubular segments, respectively indicated at 2 and 3, of a tuyere stock through which preheated air is delivered to the interior of a shaft furnace. The compensation joint 1 of FIG. 1 thus performs the same function as the compensators 14 and 15 of FIG. 1 of referenced U.S. Pat. No. 3,662,696. The tubular tuyere stock segments comprise, as is conventional practice in the art and as is shown in the case of segment 2 in FIG. 1, a steel outer shell or plate 4 on which a refractory inner lining 5 has been formed.

The compensation joint 1 includes an upper collar 12 by which the compensator is attached to the upper tubular segment 3; such attachment being achieved through the use of bolts which extend through a collar 8 integral with segment 3. The compensation joint further includes, connected to and extending downwardly from collar 12, a corrugated bellows-type element 14. The lower or downstream end of corrugated element 14 is affixed to a lower or downstream collar 6. To complete the fluid tight inter-connection of the compensation joint in the tuyere stock, the lower collar 6 is bolted to a collar 7 integral with the down-stream tubular segment 2 of the tuyere stock.

The mechanical supporting connection of the compensator joint to the segments of the tuyere stock accomplished through the use of pairs of articulation arms 15, 15' and 16, 16'. The method of mounting and the functioning of these articulation arms may clearly be seen from a joint consideration of FIGS. 1 and 2 of referenced U.S. Pat. No. 3,662,696. To briefly discuss the manner of support of the compensation joint assembly, the articulation arms 15 and 15', positioned diametrically opposite to each other with respect to the central axis of the compensator, are permanently attached at first ends thereof to upper collar 12. The articulation arms 16 and 16', which are similarly oriented diametrically opposite to one another, have first ends permanently affixed to the downstream tubular segment 2 of the tuyere stock. The articulation arms 15 and 15' are offset by 90° with respect to the articulation arms 16 and 16'. The other ends of arms 15, 15' and 16, 16' are connected, in the manner described in U.S. Pat. No. 3,662,696, to a Cardan ring 18 respectively by means of bolts 17, 17' and 19, 19' (bolt 19' not being visible in the drawing).

In the embodiment of FIG. 1 the refractory lining of the compensation joint 1 is provided with a convex lower or downstream end which cooperates with the concave upper end of the refractory lining on the tubular stock segment 2 to form a joint characterized by an approximately spherical articulation surface 20. The articulation surface 20, or more precisely the lining 5 at the upper end of stock segment 2, is provided with an upper terminating section 22 comprised of a compressible refractory material.

As noted above, the component of the Cardan-type compensation joint which is most susceptible to failure, as a result of being subjected to the exceedingly high temperature of the preheated gases which are injected into modern blast furnaces, is the corrugated or bellows-type element 14 which performs a sealing function. The cummulative effect of prolonged exposure to heat and direct contact with the heated gases may, under certain circumstances, cause the element 14 to deteriorate and ultimately lead to a leakage of hot gas to the exterior of the compensation joint. Any such leakage of preheated gas might have catastrophic consequences where the safety of personnel working near the tuyere stock is concerned.

In order to limit the temperature of the corrugated element 14, thereby substantially eliminating the deleterious effects resulting from exposure thereof to high temperatures, the compensation joints of the present invention include an annular cooling chamber positioned concentrically between the corrugated element 14 and the refractory lining of the joint. This annular cooling chamber 24, which extends over the entire length of the corrugated element 14 and is preferably comprised of heat resistant steel, receives coolant delivered to an input connector 26. The cooling chamber 24 is also coupled to a coolant outlet 28. The coolant fluid is injected into the cooling chamber 24 at a pressure of less than three atmospheres via the inlet connector 26. The coolant will usually consist of a gas, such as air, but use of a liquid coolant, such as water, is possible. The coolant will be caused to circulate completely about the interior of chamber 24 before exiting via the discharge connector 28.

Figure 2:
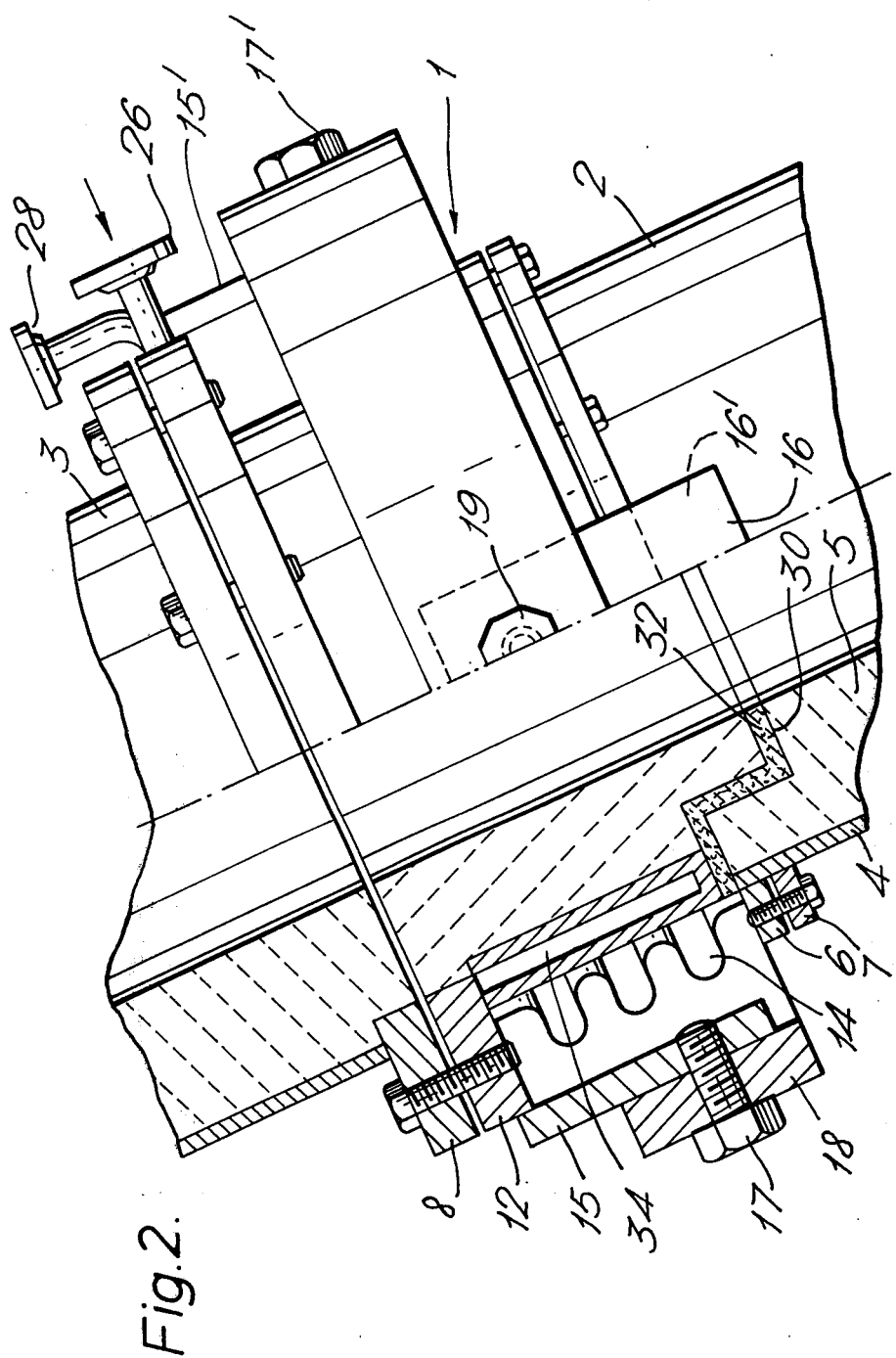
FIG. 2 is a partial longitudinal section view through a second embodiment of the present invention.

Referring now to FIG. 2, the Cardan-type compensating joint is very similar to that described above with respect to FIG. 1 with the principal exception that the approximately spherical joint defined by articulation surfaces 20 is replaced in the FIG. 2 embodiment by a cascade type joint 30. The interior of cascade joint 30 is filled with a highly refractory and compressible fiber 32. The fiber 32 serves to reduce the entry of hot gas into the joint from the interior of the tuyere stock and the circulation of hot gas within the joint. As will be obvious, maintenance of the requisite thermal insulating properties of the cascade joint requires that the dimensions of the space which receive the fiber 32 not exceed a certain maximum. On the other hand, this spacing must be sufficiently large to insure that the requisite angular movements of the joint, in response to temperature induced expansions, are not impeded.

The embodiment of the FIG. 2 employs a cooling chamber 34 which has the same relative position with respect to the corrugated element 14 as does the chamber 24 of the FIG. 1 embodiment. The cooling chamber 34 of FIG. 2 is of rectangular shape rather than having a tapering cross-section as shown in FIG. 1.

With the exception of the configuration of the joint and the shape of the cooling chamber, all of the components of the compensation joint of FIG. 2 are identical to those of FIG. 1 and the same reference numerals have been employed in both FIGS.

To summarize the invention, a Cardan-type compensating joint of the type shown and described in the referenced U.S. Pat. Nos. 3,662,696 and 3,766,868 is provided with an annular cooling chamber. In the situation where tuyere stock employs a pair of compensation joints, as is the usual instance, the two cooling chambers can be connected either in series or in parallel with respect to the source of coolant.

The cooling of Cardan-type compensation joints in accordance with the present invention has little, if any, effect on the temperature of the preheated air passing through the tuyere stock. The cooling chambers, however, contribute substantially to reduction in the stresses to which the bellows-type elements of the Cardan compensators are subjected. The present invention thus enhances the operating life of the compensation joints and, in so doing, greatly increases the safety of operation of a furnace employing such compensation joints in tuyere stocks. The cooling of a Cardan-type compensation joint also permits a reduction in price of the bellows-type elements of the compensators since these elements can be fabricated from standard, as opposed to special high temperature, steel.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. In apparatus for use in the transmission of heated fluid from a supply to a furnace, the apparatus including serially coupled conduits lined with refractory material, an improved coupling for the conduits comprising:

intermediate conduit means positioned between facing ends of the conduits, said intermediate conduit means having a refractory lining, a first surface of said lining defining a fluid flow passage having an axis;

flexible hermetic coupling means extending between exterior surfaces of the conduits, said flexible coupling means including a bellows-type element hermetically joined to and extending between a pair of collar means, one of said collar means being mounted on said intermediate conduit means, said collar means being respectively connected to the conduits whereby said bellows-type element and said collar means form a fluid tight connection between the conduits, said bellows-type element being generally coaxial with the fluid flow passage defined by said intermediate conduit means lining, said flexible coupling means bellows element being spatially displaced from said intermediate conduit means refractory lining in a direction generally radially outwardly with respect to said fluid flow passage axis;

universal connecting means connected to said one of said collar means and one of the conduits, said universal connecting means being in part positioned radially outwardly with respect to said coupling means bellows element and cooperating therewith to define an articulated mechanical connection between the conduits; and means defining an annular cooling chamber positioned between said refractory lining of said intermediate conduit means and said flexible hermetic coupling means, said cooling chamber defining means having a first wall juxtapositioned to a second surface of the refractory lining which faces outwardly with respect to the fluid flow passage, said cooling chamber defining means having a second wall positioned outwardly from said first wall whereby a passage for the flow of a coolant is in part defined by said first and second walls, said coolant flow passage having an axial length at least as great as the corrugated portion of said flexible coupling means bellows element.

2. The apparatus of claim 1 further comprising: means for delivering a fluid coolant to and withdrawing the coolant from said cooling chamber.

3. The apparatus of claim 2 wherein a first end of said intermediate conduit means refractory lining and a portion of the cooling chamber defining means form a first element of a spherical joint which cooperates with a complimentary spherical joint defining portion on an adjacent end of one of the conduits being coupled.

4. The apparatus of claim 2 wherein the refractory lining on said intermediate conduit means and the lining on the adjacent end of one of the conduits being coupled are provided with complimentary axial recesses whereby the conduit end and intermediate conduit means define a cascade joint.

5. The apparatus of claim 4 wherein said cooling chamber is characterized by a rectangular cross-section.

6. The apparatus of claim 3 wherein the coolant supplied to said cooling chamber via said delivering means is air.

7. The apparatus of claim 4 wherein the coolant supplied to said cooling chamber via said delivering means is air.

8. The apparatus of claim 7 wherein said cooling chamber is characterized by a rectangular cross-section.

* * * * *